(12) United States Patent
Linnel

(10) Patent No.: US 9,418,080 B1
(45) Date of Patent: Aug. 16, 2016

(54) METHOD AND SYSTEM FOR MOBILE STRUCTURED COLLECTION OF DATA AND IMAGES

(71) Applicant: The United States of America, as represented by the Secretary of the Navy, Washington, DC (US)

(72) Inventor: Christopher Linnel, Seaside, CA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 93 days.

(21) Appl. No.: 14/519,264

(22) Filed: Oct. 21, 2014

Related U.S. Application Data

(60) Provisional application No. 61/894,282, filed on Oct. 22, 2013.

(51) Int. Cl.
*G06K 9/60* (2006.01)
*G06F 17/30* (2006.01)
*G11B 27/10* (2006.01)

(52) U.S. Cl.
CPC ............ *G06F 17/3028* (2013.01); *G11B 27/10* (2013.01)

(58) Field of Classification Search
CPC .. G06T 11/60; H04N 1/3876; H04N 5/23238; G06K 2009/2045
See application file for complete search history.

(56) References Cited

U.S. PATENT DOCUMENTS

| 7,234,106 B2 | 6/2007 | Simske |
| 7,450,734 B2 | 11/2008 | Rodriguez et al. |
| 7,453,472 B2 | 11/2008 | Goede et al. |
| 8,243,984 B1 | 8/2012 | Brown et al. |
| 8,375,283 B2 | 2/2013 | Fei et al. |
| 2011/0184954 A1 | 7/2011 | Nelson |

OTHER PUBLICATIONS

Chong Wang et al., Simultaneous Image Classification and Annotation, IEEE Conference on Computer Vision and Pattern Recognition, 2009, p. 1903-1910.
Jordan Running, How to Make and Annotate Maps with Google My Maps, Available online at http://www.tucows.com/article/1567, Jul. 5, 2013.
Scribble Maps, Available online at http://www.scribblemaps.com/, Oct. 8, 2013.
Evernote Skitch, Available online at http://evernote.com/skitch/, Sep. 6, 2013.

*Primary Examiner* — Duy M Dang
(74) *Attorney, Agent, or Firm* — Naval Postgraduate School; Lisa A. Norris

(57) ABSTRACT

The present invention is a method for improving functionality of a smart device to perform mobile structured collection and transformation of data includes instantiating an ATAK Session Object having multiple Session Object Attributes including a geo-specific location attribute having a geo-specific location attribute value. The method then updates the geo-specific location attribute of the ATAK Session Object to reflect a geo-specific location and links an Image Object with the ATAK Session Object to create a Linked ATAK Image Object. Next, the method instantiates an Observational Record Object (ORO) having an ORO attribute value reflecting an observation instance at the geo-specific location. Finally, the method creates a Linked ORO by linking the ORO with the Linked ATAK Image Object. The present invention also includes an apparatus and system for performing the above method.

18 Claims, 4 Drawing Sheets

METHOD AND SYSTEM FOR MOBILE STRUCTURED COLLECTION OF DATA AND IMAGES

CROSS-REFERENCE TO RELATED PATENT APPLICATIONS

This application is a non-provisional application of and claims priority to U.S. Patent Application 61/894,282, filed on Oct. 22, 2013, which is hereby incorporated by reference in its entirety.

BACKGROUND OF THE INVENTION

1. Field of the Invention

This invention relates to the field of data processing, and more specifically, to preparing data for information retrieval by transforming data structures and data objects.

2. Description of the Related Art

A smart device is an electronic communications device capable of performing operations independently or interactively with other devices. Smart devices have independent processing capability and connect to wireless networks using various protocols such as Bluetooth, allowing them to operate interactively and autonomously. Manufacturers continuously update smart devices and their protocols to allow faster communications and more complex processing. Many smart devices known in the art boot up rapidly and provide quick connectivity using their respective protocols.

The Android Tactical Assault Kit (ATAK) is a government open source software project with the objective of providing troops with geo-specific information during operations using "smart devices" such as smart phones and tablets.

ATAK currently utilizes the Android operating system and associated protocols in conjunction with commercially available smart devices such as Android phones and tablet. The Android operating system and other smart phone operating systems offer GPS capability, and the ability to interact with object-oriented programming tools and data management programs known in the art such as Java and SQL.

The military currently utilizes the GPS capability of the Android operating system for intelligence gathering and during military operations to collect location-specific data. For example, military observers can identify items that appear in the images such as schools or hospitals to avoid damaging them during an operation, designate pickup points for evacuation, or note the presence of weapons and hostile persons. The ability to provide annotated visual data in real time reduces military dependence on voice channels, and can graphically designate points of interest more accurately.

ATAK enables the collection of large amounts of data and collection of countless on-site observations. ATAK integrates capabilities for gathering image and other data from individual observers and for associating data collected from each user. ATAK also allows collaborative mapping and sharing of drawings created by each user, as well as features that facilitate real time intelligence gathering including file sharing, photo sharing, video sharing, data streaming and interfaces for military communications systems. ATAK also includes Java programming capabilities and the development of applications to customize the operating system.

Despite the integration of these sophisticated tools, ATAK has several known limitations that prevent the use of ATAK for rapid analytics using data gathered during battle. A major limitation is that data from multiple observers appears in heterogeneous (non-standard) formats, since each user has an individualized approach to gathering data. This requires subjective interpretation and human correlation of data obtained from each user. In some instances, a third party receiving data may need to correlate and create reports from multiple observers through intensive, time-consuming review.

Additionally, since observers do not gather data in a structured manner, many of their observations may be irrelevant or incomplete. Gathering irrelevant data adds time to the process during critical missions.

Currently, despite the near real-time communications capability of smart devices and the broad functionality of ATAK, it is not possible to retrieve, cross-reference and validate intelligence data gathered from multiple observers in real time during military operations.

SUMMARY OF THE INVENTION

In accordance with one embodiment, a method for improving the functionality of a smart device to perform mobile structured collection and transformation of data includes instantiating an ATAK Session Object having a plurality of Session Object Attributes including at least one geo-specific location attribute having a geo-specific location attribute value. The method then updates the geo-specific location attribute of the ATAK Session Object to reflect at least one geo-specific location. Next, the method links at least one Image Object with the ATAK Session Object to create at least one Linked ATAK Image Object. The method then instantiates at least one Observational Record Object (ORO) having at least one ORO attribute value reflecting at least one observation instance at one of the at least one geo-specific location. Finally, the method links the at least one ORO with the at least one Linked ATAK Image Object to create at least one Linked ORO.

In accordance with one embodiment, an apparatus for mobile structured collection of data and images includes a smart device configured with software to create a smart device processing component functionally capable of displaying and updating a graphical user interface (GUI) to receive user input data associated with observations and to transform the user input data into object databases configured for search and retrieval operations, wherein the smart device processing component is configured to perform transformative functions to create quasi-unique data structures using the above method.

In accordance with one embodiment, a system for mobile structured collection of data and images includes at least one smart device configured with software to instantiate, update and link at least one ATAK Session Object, at least one ATAK Image Object and at least one ORO, at least one remote computer configured to receive the at least one ATAK Session Object, the at least one ATAK Image Object and the at least one Observational Record Object and a connection interface which allows the smart device to transmit data associated with the at least one ATAK Session Object, the at least one ATAK Image Object and the at least one ORO to the at least one remote computer.

BRIEF DESCRIPTION OF THE DRAWINGS

FIG. 1, shown in partial views

DETAILED DESCRIPTION OF INVENTION

Figure 1A:
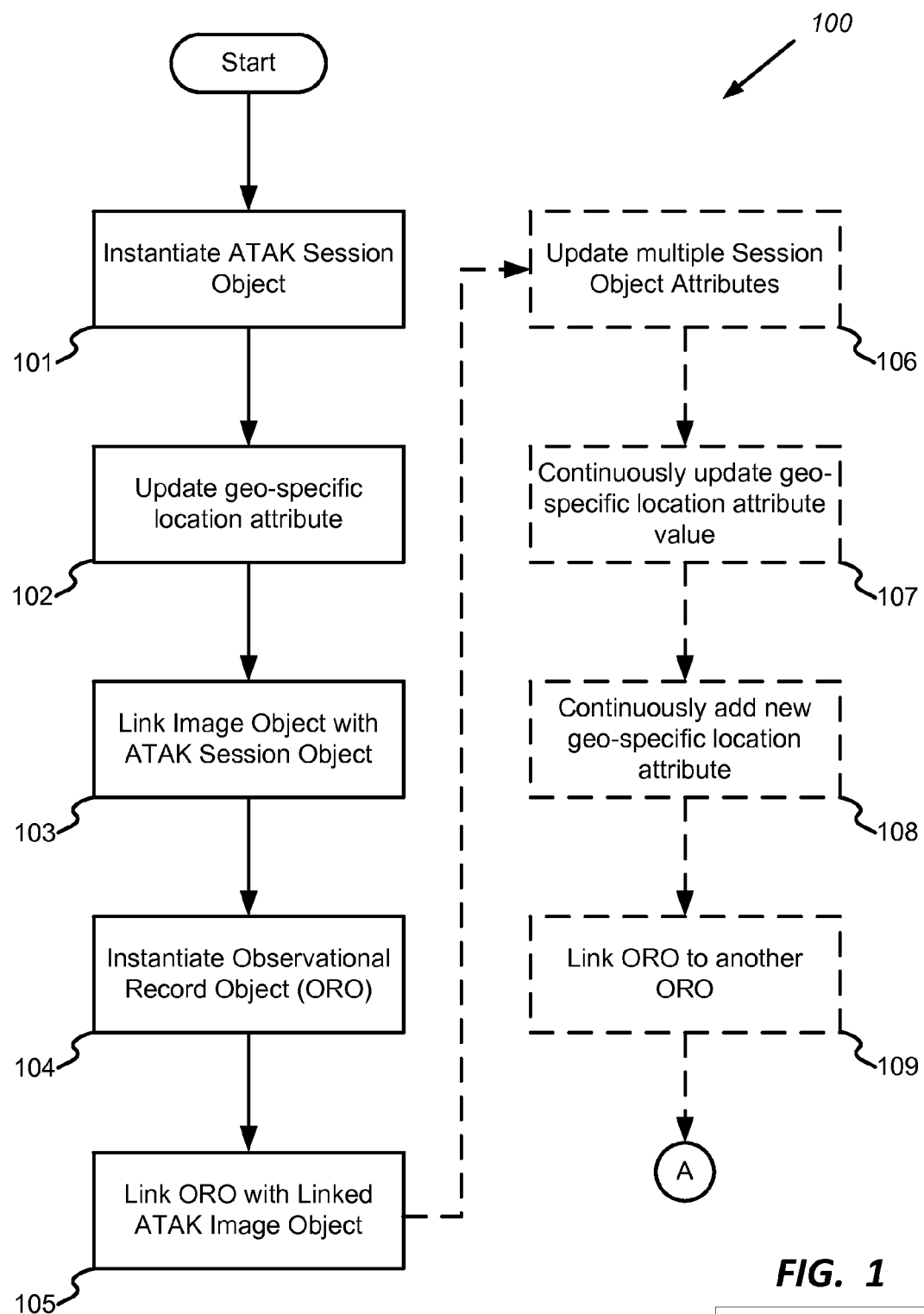
FIG. 1A and FIG. 1B, illustrates a process flow diagram of a method for improving the functionality of a smart device to perform mobile structured collection and transformation of data in accordance with one embodiment of the invention.
Figure 1B:
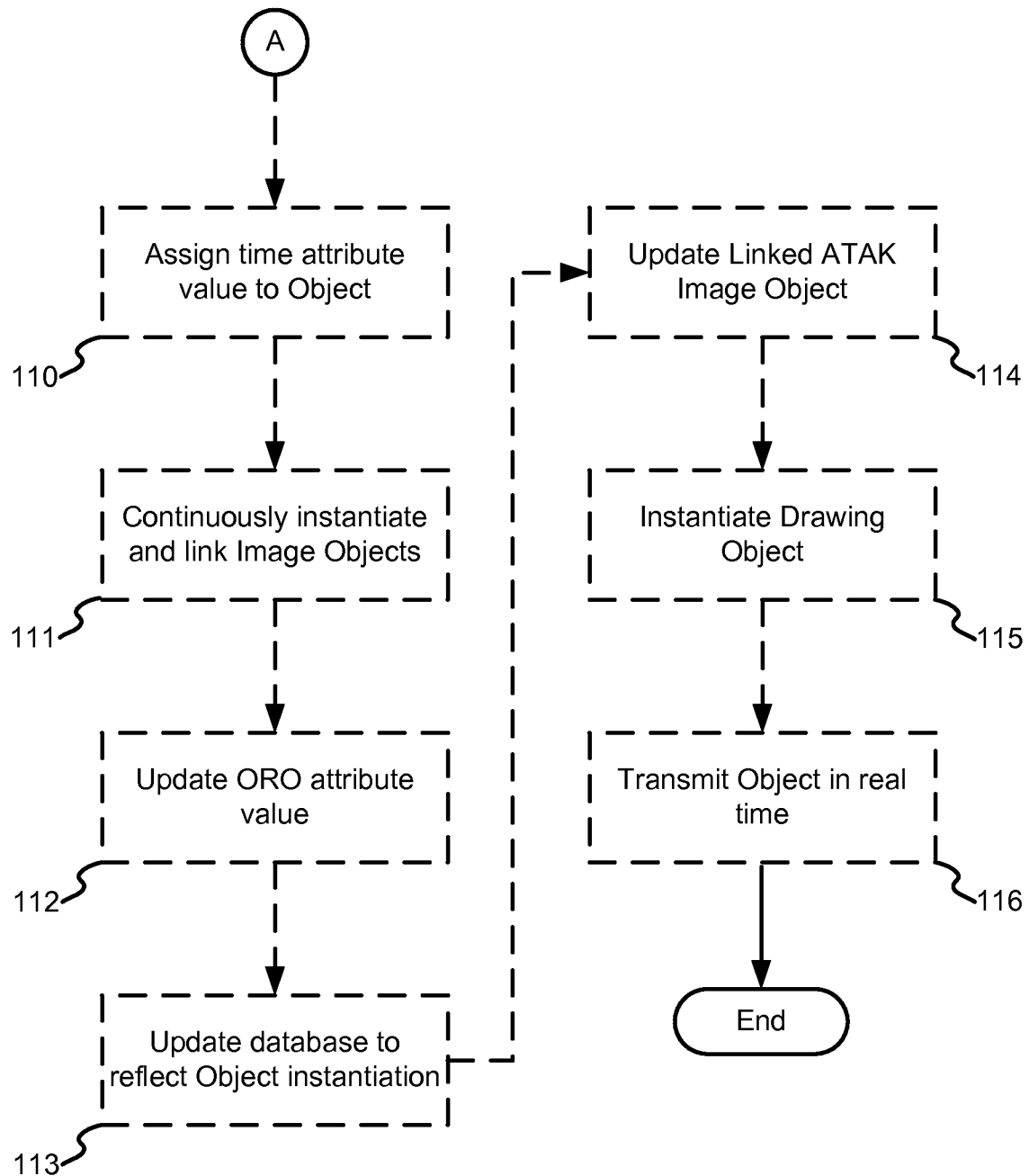

FIG. 1 illustrates a process flow diagram of method 100 for improving the functionality of a smart device to perform mobile structured collection and transformation of data in accordance with one embodiment of the invention. In the exemplary embodiment of method 100, a smart device 200 is configured to display a Graphical User Interface (GUI) 202, which continuously receives data from an observer.

In various embodiments, smart device 200 is programmed receive data in a structured format and to prompt the user to enter values necessary to completely describe observations relevant to a location depicted in an image taken by smart device 200 using imaging components 204 known in the art.

In various embodiments, the data may be entered in structured formats using GUI prompts and updated GUI screens. In the exemplary embodiment shown, data entered by an observer updates the attribute values and fields of the novel software objects described herein. An "update" may include instantiating a new instance of an object described herein, creating a new field, populating a data field or changing the value within a data field to reflect user observation.

Method 100 creates various novel software objects for collecting observational data consistent with an object-oriented programming language known in the art or any program capable of creating and utilizing heterogeneous data structures for collection of observational data. In the embodiment shown, a heterogeneous data structure is a data structure exhibiting consistent characteristics that render the data structure suitable for search, query and analytical operations.

In the exemplary embodiment shown, programming utilizes Java and other Application Programming Interface (API) language incorporated into ATAK and/or the operating system of smart device 200. The exemplary embodiment described herein uses the Java programming language or any API available and capable of interfacing with the operating system of the smart device. Observational data may include data, images and any other information capable of being transmitted by smart device 200 using any signal, computer language, computer protocol or transmission protocol known in the art.

In the exemplary method 100, an observer updates data by entering values in GUI 202 of smart device 200. As data updates, the data instantiates or creates novel objects further described herein to populate attribute values (e.g., fields), which define a characteristic or value associated with objects. As used herein, the term "object" refers to any data structure known in the art, and may include data of any type. Objects may or may not include functions which are invoked when data attribute values update or change, or when certain thresholds or other criteria are met. As used herein, the term "attribute" refers to any specification that defines a property of an object. As used herein, the term "attribute value" refers the specific data populating such an attribute. As used herein, the term "real time" refers to events, observations and transmissions that occur during or in a time frame that is proximate to the time frame during which a user enters observation data. A proximate time frame may vary, but is generally a time frame during which observational data remains current and usable.

In operation 101, method 100 instantiates an ATAK Session Object 10. ATAK Session Object 10 has multiple Session Object Attributes 12. Session Object Attributes 12 include at least one geo-specific location attribute 14 having a geo-specific location attribute value 16. As used herein, the term "geo-specific location attribute" refers to an attribute specifically to a geographical location, such as, but not limited to, geographical coordinates. In various embodiments, Session Object Attributes 12 may also include quasi-unique identifying numbers, data, or time attributes. As used herein, the term "quasi-unique" refers to an element different from other elements within the same method, device or system.

In operation 102, method 100 updates geo-specific location attribute 14 of ATAK Session Object 10 to reflect at least one geo-specific location 18.

In operation 103, method 100 links at least one Image Object 20 with ATAK Session Object 10 to create at least one Linked ATAK Image Object 22. Image Object 20 may include image files in raster formats, vector formats or compound formats.

In operation 104, method 100 instantiates at least one Observational Record Object (ORO) 24 having at least one ORO attribute value 36 reflecting at least one observation instance 26 at geo-specific location 18. In one exemplary embodiment, a user instantiates ORO 24 reflecting one of the following: biometrics, buildings, documents, drugs, electronics, explosives, materials, persons, relational, sites, vehicles or weapons. For example, a user may select "building" to instantiate ORO 24 reflecting that the user has noted a building. In the exemplary embodiment, ORO attribute values 36 relating to buildings may include building type, number of entrances, number of people in residence, construction type and owner.

In operation 105, method 100 links at least one ORO 24 with at least one Linked ATAK Image Object 22 to create at least one Linked ORO 28.

In optional operation 106, method 100 updates multiple Session Object Attributes 12. Each Session Object Attribute 12 reflects data about an observational session 30.

In optional operation 107, method 100 continuously updates at least one geo-specific location attribute value 16 within ATAK Session Object 10 to reflect a change in at least one geo-specific location 18.

In optional operation 108, method 100 continuously adds a new geo-specific location attribute 14 within ATAK Session Object 10 to correspond to additional geo-specific locations 18 observed within observational session 30 associated with ATAK Session Object 10.

In optional operation 109, method 100 links at least one ORO 24 to at least one other ORO 24 by updating at least one object relationship attribute value 32 within each ORO 24. For example, if ORO 24 indicates a building and another ORO 24 indicates a person, object relationship attribute value 32 may indicate that the person is the building owner or a resident. In another example, if ORO 24 indicates a vehicle and another ORO 24 indicates drugs, object relationship attribute value 32 may indicate that the drugs were found in the vehicle.

In optional operation 110, method 100 assigns at least one time attribute value 34 to at least one object selected from a group consisting of: ATAK Session Object 10, Linked ATAK Image Object 22, ORO 24 and Linked ORO 28.

In optional operation 111, method 100 continuously instantiates and links Image Objects 20 to create additional Linked ATAK Image Objects 22 associated with ATAK Session Object 10.

In optional operation 112, method 100 updates at least one ORO attribute value 36 of ORO 24 until all mandatory fields of ORO 24 have been populated. As used herein, the term "mandatory fields" refers to preselected attributes of ORO 24 that method 100 must populate.

In optional operation 113, method 100 updates at least one database 38 to reflect instantiation of an object. Database 38 is selected from the group consisting of: an ATAK Session Object database 40, a geo-location database 42, an Image Object database 44, an ORO database 46 and a user-defined database 48. Database 38 is located on smart device 200 or on at least one external computer 310 on a network 350. External computer 310 is configured with database management software 320 capable of performing a query of database 38 to identify objects having queried attributes or to identify objects are linked to other objects having queried attributes.

In optional operation 114, method 100 updates Linked ATAK Image Object 22 by using a drawing function to update visual attribute values 50 that appear on GUI 202.

In optional operation 115, method 100 instantiates a Drawing Object 52 by entering a plurality of image coordinate values 54 and at least one visual attribute value 50, and linking Drawing Object 52 to at least one ATAK Image Object 22.

In optional operation 116, method 100 transmits in real time at least one object from smart device 200 to at least one external computer 310 on network 350.

Figure 2:
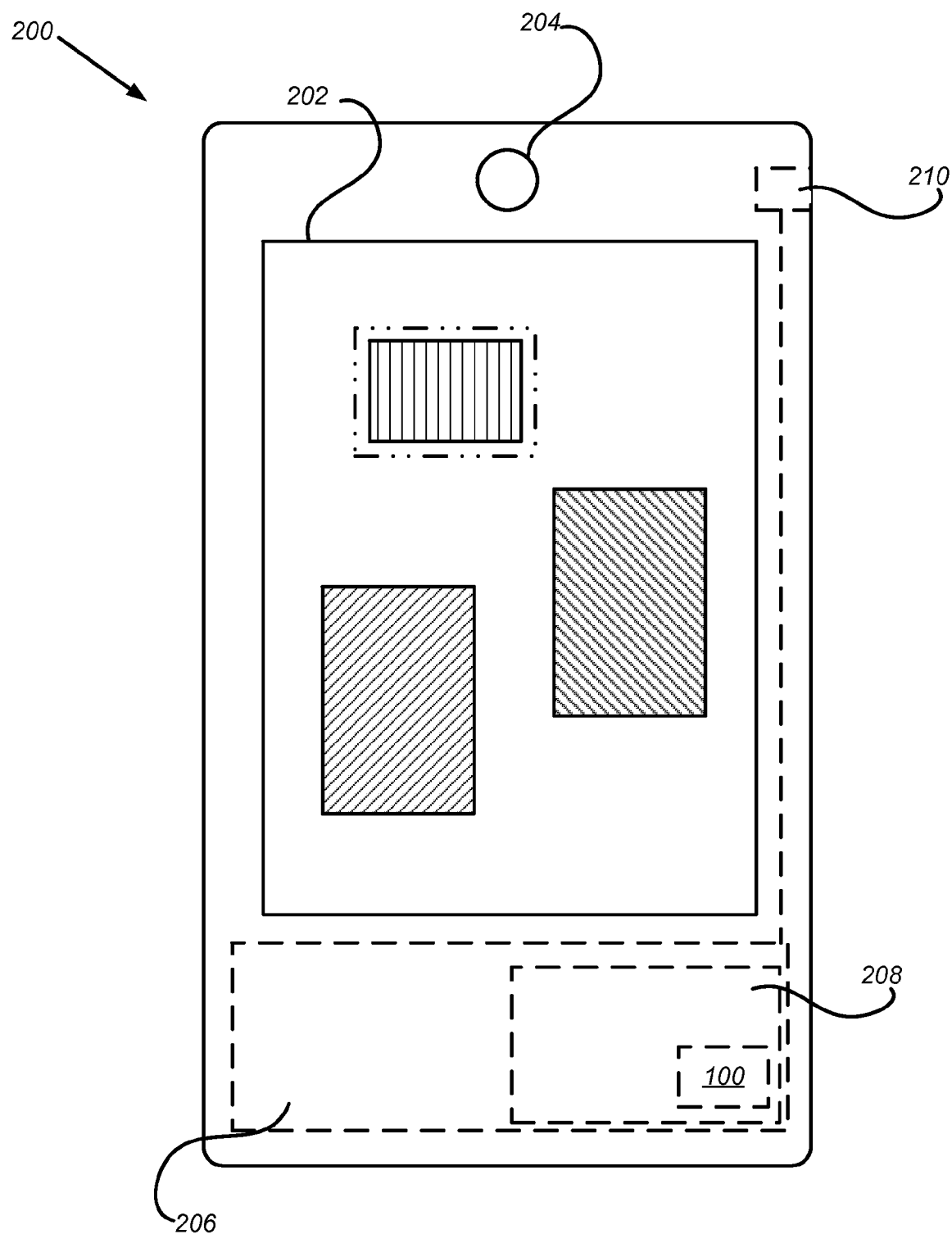
FIG. 2 illustrates a device including the method of FIG. 1 in accordance with one embodiment of the invention.

FIG. 2 illustrates a smart device 200 including method 100 of FIG. 1 in accordance with one embodiment of the invention. Smart device 200 includes graphical user interface (GUI) 202, imaging components 204, a smart device processing component 206 configured with software 208, and a connection interface 210. Smart device 200 may be any smart device known in the art, such as, but not limited to, a smart phone, tablet or personal digital assistant.

An observer instantiates ATAK Session Object 10 and ORO 24 by entering observational data through GUI 202, and implementing method 100. Similarly, once instantiated, a user may update ATAK Session Object 10 and ORO 24 to reflect additional data using GUI 202. In the embodiment shown, GUI 202 displays options to allow an observer to enter data to perform each step of method 100.

Imaging components 204 allow an observer to create Image Object 20. Imaging components 204 may be still or video cameras known in the art.

Smart device processing component 206 is configured with software 208 functionally capable of displaying and updating GUI 202. This allows smart device processing component 206 to receive user input data associated with observations and to transform said user input data into objects, such as ATAK Session Object 10 and ORO 24, and databases 38 configured for search and retrieval operations. Smart device processing component 206 is configured to perform the transformative functions of method 100 to create quasi-unique data structures.

Connection interface 210 allows smart device 200 to transmit data associated with ATAK Session Object 10, ATAK Image Object 20 and ORO 24.

Figure 3:
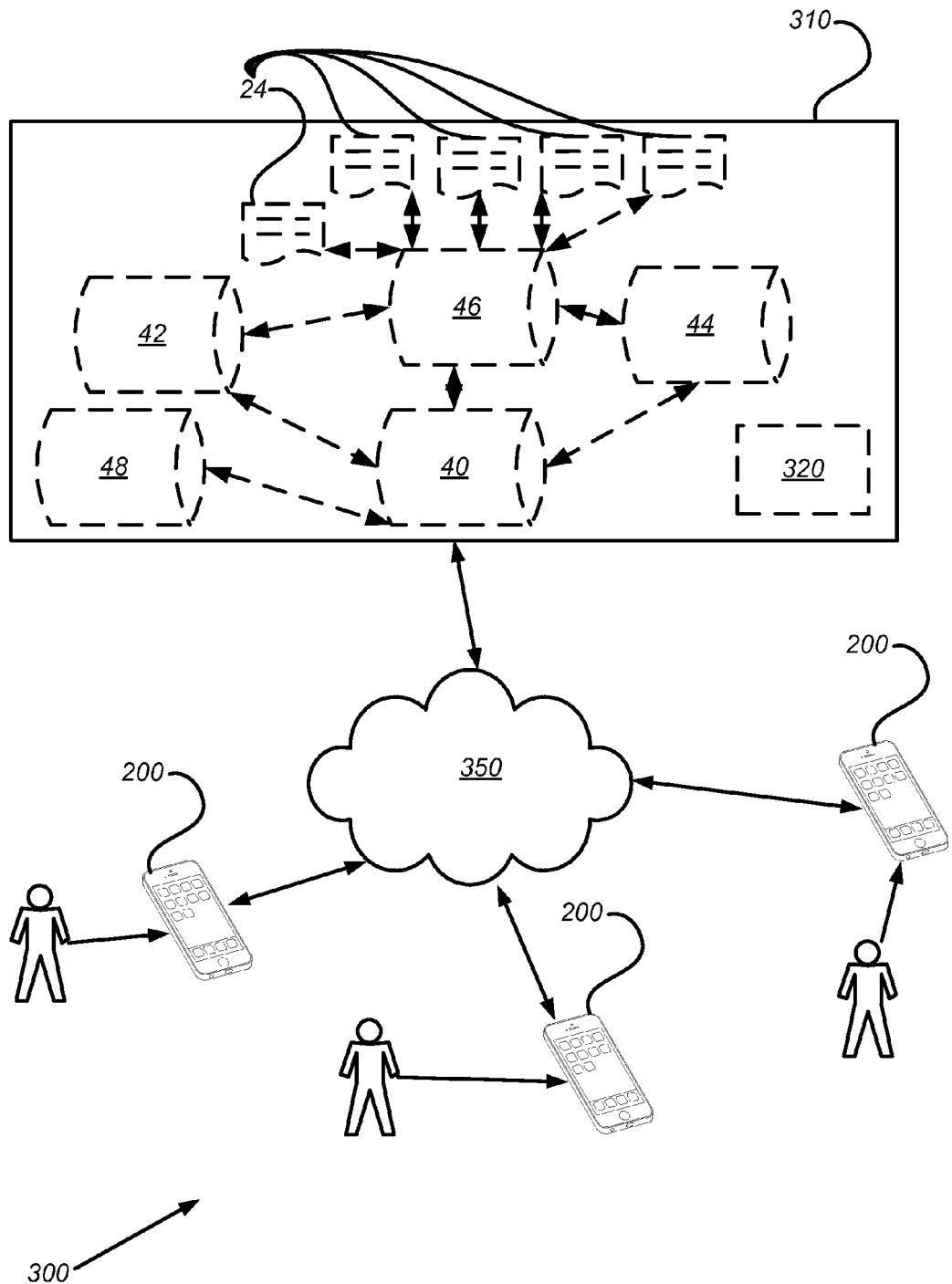
FIG. 3 illustrates a system including the method of FIG. 1 for mobile structured collection of data and images in accordance with one embodiment of the invention.

FIG. 3 illustrates a system 300 including method 100 of FIG. 1 for mobile structured collection of data and images in accordance with one embodiment of the invention. System 300 includes multiple smart devices 200, at least one external computer 310, optional database management software 320 and network 350.

In the exemplary embodiment shown, system 300 comprises a plurality of devices 200 configured to perform method 100. In various embodiments, external computer 310 is also configured to perform method 100. External computer 310 may also include additional database management capability through optional database management software 320. External computer 310 may be a single computer or a plurality of geographically distributed computers.

System 300 of the exemplary embodiment further includes ATAK Session Object database 40, geo-location database 42, Image Object database 44, ORO database 46 and user-defined database 48. In the embodiment shown, ATAK Session Object database 40, geo-location database 42, Image Object database 44, ORO database 46 and user-defined database 48 are Structured Query Language (SQL) databases. In various embodiments, ATAK Session Object database 40, geo-location database 42, Image Object database 44, ORO database 46 and user-defined database 48 may by any type of relational database known in the art that may be used for updating objects and files pertaining to observational data.

In the embodiment shown, any database management system 320 may be used, including database management systems that perform some or all of the functions of Sybase, Microsoft SQL Server, Access, Ingres, etc.

In the exemplary embodiment, system 300 transmits objects via network 350 to external computer 310 for storage in a format retrievable using any database management system 320 known in the art having data search and retrieval capability. Network 350 enables communication and data transmission between multiple devices 200 or between device 200 and another element of system 300, such as, but not limited to, external computer 310. In the exemplary embodiment, network 350 is a cloud-based network. In various embodiments, network 350 is a virtual private network, a local area network or a wide area network.

System 300 is implemented on geographically distributed hardware components, for structured data collection by multiple observers. The components of system 300 may reside on any combination of hardware devices (including processors, smart devices and data storage components) configured to provide functionality to system 300. One or more of the components shown in in FIG. 3 may reside on a single or multiple devices 200, or a single or multiple networks 340.

It will be understood that many additional changes in the details, materials, procedures and arrangement of parts, which have been herein described and illustrated to explain the nature of the invention, may be made by those skilled in the art within the principle and scope of the invention as expressed in the appended claims.

What is claimed is:

1. A method for performing mobile structured collection and transformation of data on a smart device comprising:
  instantiating an Android Tactical Assault Kit (ATAK) Session Object having a plurality of Session Object Attributes including at least one geo-specific location attribute having a geo-specific location attribute value;
  updating said geo-specific location attribute of said ATAK Session Object to reflect at least one geo-specific location;
  linking at least one Image Object with said ATAK Session Object to create at least one Linked ATAK Image Object;
  instantiating at least one Observational Record Object (ORO) having at least one ORO attribute value reflecting at least one observation instance at one of said at least one geo-specific location; and
  linking said at least one ORO with said at least one Linked ATAK Image Object to create at least one Linked ORO.

2. The method of claim 1 further comprising updating said plurality of Session Object Attributes, wherein each of said plurality of Session Object Attributes reflects data about an observational session.

3. The method of claim 1, further comprising continuously updating said at least one geo-specific location attribute value within said ATAK Session Object to reflect a change in said at least one geo-specific location.

4. The method of claim 1, further comprising continuously adding a new geo-specific location attribute within said ATAK Session Object to correspond to additional geo-specific locations observed within an observational session associated with said ATAK Session Object.

5. The method of claim 1, further comprising linking at least one ORO to at least one other ORO by updating at least one object relationship attribute value within each of said at least one OROs.

6. The method of claim 1, further comprising assigning at least one time attribute value to at least one object selected from a group consisting of: said ATAK Session Object, said at least one Linked ATAK Image Object, said at least one ORO and said at least one Linked ORO.

7. The method of claim 1, further comprising continuously instantiating and linking Image Objects to create additional Linked ATAK Image Objects associated with said ATAK Session Object.

8. The method of claim 1 further comprised updating said at least one ORO attribute value of said at least one ORO until all mandatory fields of said ORO have been populated.

9. The method of claim 1, further comprising updating at least one database to reflect instantiation of an object, wherein said database is selected from a group consisting of: an ATAK Session Object database, a geo-location database, an Image Object database, an ORO database and a user-defined database.

10. The method of claim 9 wherein said at least one database is located on said smart device.

11. The method of claim 9 wherein said at least one database is located on at least one external computer on a network, and wherein said at least one external computer is configured with database management software capable of performing a query of said at least one database to identify objects having queried attributes.

12. The method of claim 9 wherein said at least one database is located on at least one external computer on a network, and wherein said at least one external computer is configured with database management software capable of performing a query of said at least one database which further identifies objects which are linked to objects having queried attributes.

13. The method of claim 1, further comprising updating said at least one Linked ATAK Image Object by using a drawing function to update visual attribute values, which appear on a GUI.

14. The method of claim 13, further comprising instantiating a Drawing Object by entering a plurality of image coordinate values and at least one visual attribute value and linking said Drawing Object to said at least one ATAK Image Object.

15. The method of claim 1, further comprising transmitting in real time at least one object from said smart device to at least one external computer on a network.

16. An apparatus for mobile structured collection of data and images comprising:
 a smart device configured with software to create a smart device processing component functionally capable of displaying and updating a graphical user interface (GUI) to receive user input data associated with observations and to transform said user input data into object databases configured for search and retrieval operations,
 wherein said smart device processing component is configured to perform the following transformative functions to create quasi-unique data structures:
  instantiating an Android Tactical Assault Kit (ATAK) Session Object having a plurality of Session Object Attributes including at least one geo-specific location attribute having a geo-specific location attribute value;
  updating said geo-specific location attribute of said ATAK Session Object to reflect at least one geo-specific location;
  linking at least one Image Object with said ATAK Session Object to create at least one Linked ATAK Image Object;
  instantiating at least one ORO reflecting at least one observation instance at one of said at least one geo-specific location; and
  linking said at least one ORO with said at least one Linked ATAK Image Object to create at least one Linked ORO.

17. The apparatus of claim 16 wherein said smart device is further configured to transmit said user input data from at least one object to a remote computer wherein said at least one object is selected from a group consisting of said at least one ATAK Session Object, said at least one ATAK Image Object, said at least one ORO and at least one User-Defined Object.

18. The apparatus of claim 17 wherein said smart device is further configured with a connection interface that allows said smart device to transmit said user input data associated with at least one ATAK Session Object to said at least one remote computer in real time.

\* \* \* \* \*